United States Patent [19]

Masai et al.

[11] 4,377,025
[45] Mar. 22, 1983

[54] METHOD OF MOUNTING HEAT EXCHANGER SUPPORT SYSTEM

[75] Inventors: John F. Masai, Carson; Fred W. Jacobsen, Garden Grove, both of Calif.

[73] Assignee: The Garrett Corporation, Los Angeles, Calif.

[21] Appl. No.: 220,548

[22] Filed: Dec. 29, 1980

Related U.S. Application Data

[62] Division of Ser. No. 955,115, Oct. 26, 1978, Pat. No. 4,263,964.

[51] Int. Cl.³ .............................................. B23P 19/00
[52] U.S. Cl. ........................................ 29/434; 29/469; 29/526 R; 248/324; 248/327; 248/343
[58] Field of Search ............. 29/434, 150, 469, 526 R; 248/323, 324, 327, 317, 342, 343, 58, 60, 63, 659; 165/67, 81, 82

[56] References Cited

U.S. PATENT DOCUMENTS

| | | | |
|---|---|---|---|
| 1,599,656 | 9/1926 | Crowley | 248/343 |
| 1,779,564 | 10/1930 | Slagel | 248/327 X |
| 1,804,420 | 5/1931 | Kelley | 29/434 UX |
| 1,814,627 | 7/1931 | Allen | 165/67 X |
| 1,827,325 | 10/1931 | Mack | 248/63 UX |
| 2,069,515 | 2/1937 | Armacost et al. | 165/67 |
| 2,195,887 | 4/1940 | Kotzebue | 165/67 X |
| 2,420,135 | 5/1947 | Hennig | 165/81 X |
| 2,876,975 | 3/1959 | Short | 165/67 X |
| 3,236,295 | 2/1966 | Yurko | . |
| 3,273,636 | 9/1966 | Hickey et al. | 165/67 |
| 3,325,158 | 6/1967 | Ginder | 29/469 |
| 3,434,531 | 3/1969 | Hochmuth et al. | 165/67 |
| 3,447,598 | 6/1969 | Kaess, Jr. | 165/82 X |
| 3,751,783 | 8/1973 | Roberts, Jr. et al. | 29/469 X |
| 3,868,760 | 3/1975 | Korkut | 29/469 X |
| 3,951,108 | 4/1976 | Rees | 165/81 X |
| 3,982,902 | 9/1976 | Lortz | 248/324 X |
| 4,236,574 | 12/1980 | Bosne | 165/67 |

FOREIGN PATENT DOCUMENTS

| | | | |
|---|---|---|---|
| 1169003 | 12/1958 | France | 165/67 |
| 1208629 | 2/1960 | France | 165/67 |

*Primary Examiner*—Charlie T. Moon
*Attorney, Agent, or Firm*—Henry M. Bissell; Albert J. Miller; James W. McFarland

[57] ABSTRACT

Arrangements for supporting a heat exchanger core within a steel frame structure by a hanger system utilizing flexible members pivotably coupled to overhead support beams. Balancing beams are employed to equalize the load transmitted through the system to the support beams. These support systems permit the heat exchanger core to expand in all directions from thermal growth without restraint relative to the frame structure, thereby minimizing thermal fatigue.

9 Claims, 8 Drawing Figures

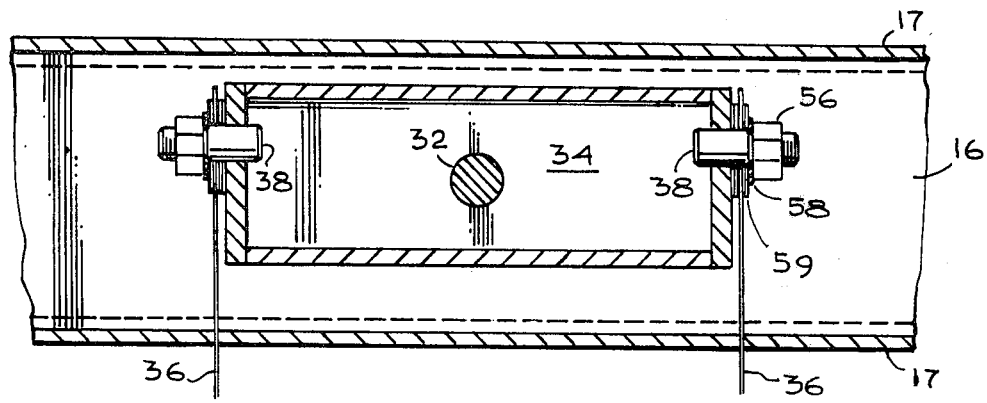
Fig. 4
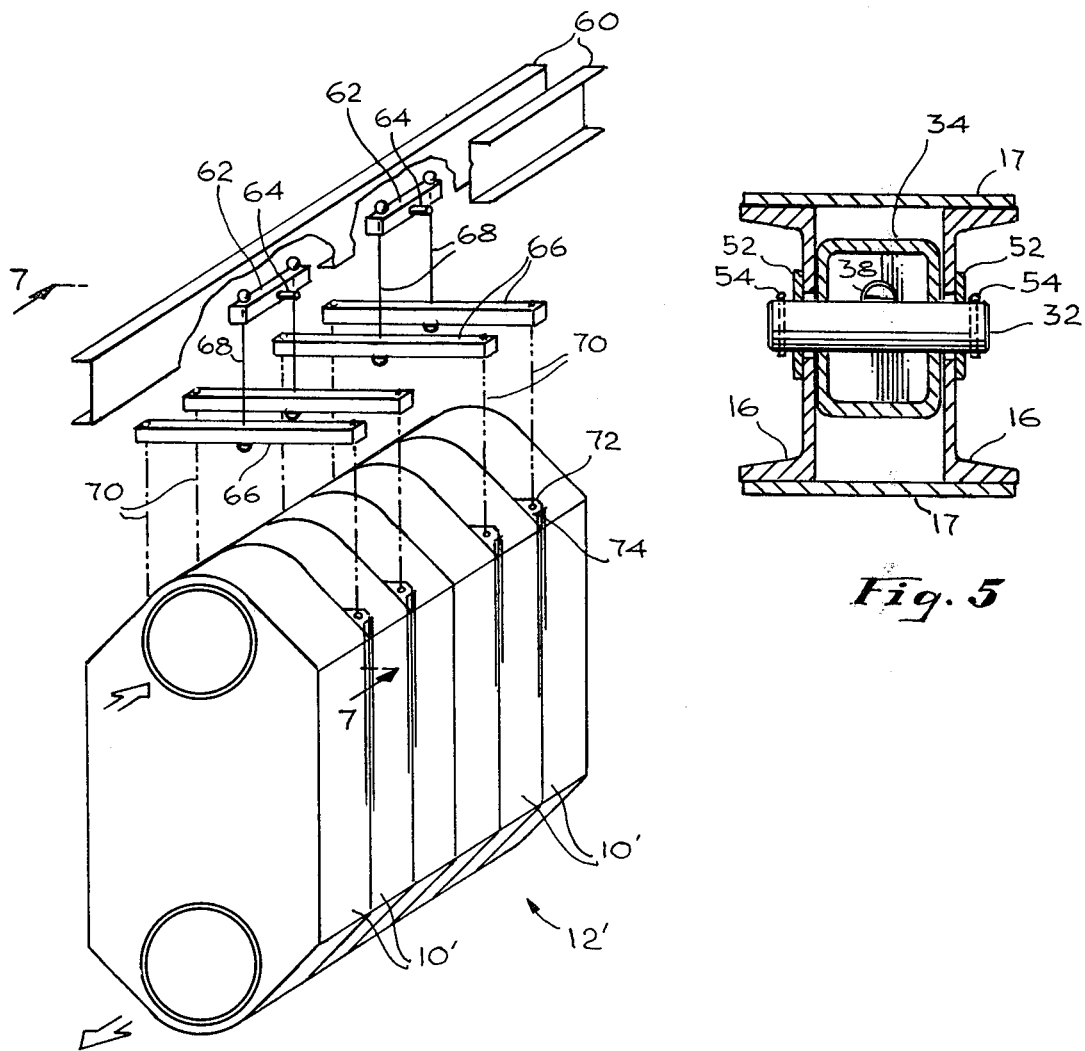
Fig. 5
Fig. 6

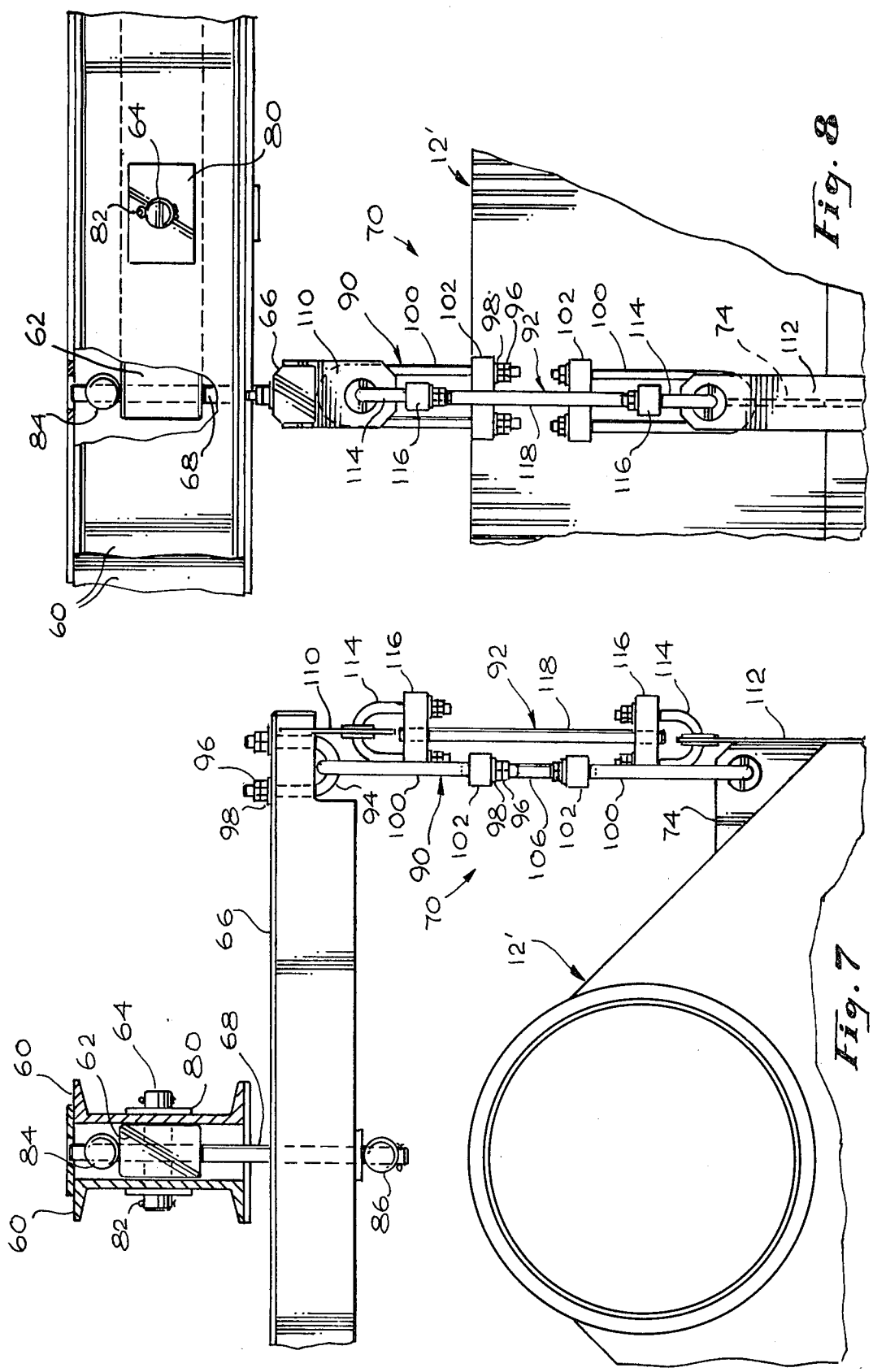

METHOD OF MOUNTING HEAT EXCHANGER SUPPORT SYSTEM

This is a division of application Ser. No. 955,115 filed Oct. 26, 1978, now U.S. Pat. No. 4,263,964, issued Apr. 28, 1981.

INTRODUCTION

Heat exchangers incorporating apparatus of the present invention have been developed for use with large gas turbines for improving their efficiency and performance while reducing operating costs. Heat exchangers of the type under discussion are sometimes referred to as recuperators, but are more generally known as regenerators. A particular application of such units is in conjunction with gas turbines employed in gas pipe line compressor drive systems.

Several hundred regenerated gas turbines have been installed in such applications over the past twenty years or so. Most of the regenerators in these units have been limited to operating temperatures not in excess of 1000° F. by virtue of the materials employed in their fabrication. Such regenerators are of the plate-and-fin type of construction incorporated in a compression-fin design intended for continuous operation. However, rising fuel costs in recent years have dictated high thermal efficiency, and new operating methods require a regenerator that will operate more efficiently at higher temperatures and possesses the capability of withstanding thousands of starting and stopping cycles without leakage or excessive maintenance costs. A stainless steel plate-and-fin regenerator design has been developed which is capable of withstanding temperatures to 1100° or 1200° F. under operating conditions involving repeated, undelayed starting and stopping cycles.

The previously used compression-fin design developed unbalanced internal pressure-area forces of substantial magnitude, conventionally exceeding one million pounds in a regenerator of suitable size. Such unbalanced forces tending to split the regenerator core structure apart are contained by an exterior frame known as a structural or pressurized strongback. By contrast, the modern tension-braze design is constructed so that the internal pressure forces are balanced and the need for a strongback is eliminated. However, since the strongback structure is eliminated as a result of the balancing of the internal pressure forces, the changes in dimension of the overall unit due to thermal expansion and contraction become significant. Thermal growth must be accommodated and the problem is exaggerated by the fact that the regenerator must withstand a lifetime of thousands of heating and cooling cycles under the new operating mode of the associated turbo-compressor which is started and stopped repeatedly.

Confinement of the extreme high temperature in excess of 1000° F. to the actual regenerator core and the thermal and dimensional isolation of the core from the associated casing and support structure, thereby minimizing the need for more expensive materials in order to keep the cost of the modern design heat exchangers comparable to that of the plate-type heat exchangers previously in use, have militated toward various mounting, coupling and support arrangements which together make feasible the incorporation of a tension-braze regenerator core in a practical heat exchanger of the type described.

Heat exchangers of the type generally discussed herein are described in an article by K. O. Parker entitled "Plate Regenerator Boosts Thermal and Cycling Efficiency", published in *The Oil & Gas Journal* for Apr. 11, 1977.

BACKGROUND OF THE INVENTION

1. Field of the Invention

This invention relates to heat exchangers of the plate-and-fin type and, more particularly, to a support system for a multi-ton heat exchanger mounted within a steel support structure.

2. Description of the Prior Art

Various arrangements are known in the prior art for supporting displaceable devices of substantial weight. Some of these arrangements depend upon support members in compression, others in tension, still others by balancing levers and weights. The R. C. Allen U.S. Pat. No. 1,814,627 for example discloses a turbine support system comprising three fixed support points and additional yieldable points to assume a portion of the load. The yieldable support points include fulcrums with levers and counterweights for weight distribution.

The economizer of the Armacost U.S. Pat. No. 2,069,515 comprises a plurality of superposed tubes interconnected by bolts and suspended by tube fins from fixed beams. The Short U.S. Pat. No. 2,876,975 discloses head exchange apparatus supported by tubes. Expansion is permitted by elongated openings for support fastenings.

The Yurko U.S. Pat. Nos. 3,236,295, Kotzebue 2,195,887, Hickey et al 3,273,636 and Lortz 3,982,902 are examples of arrangements utilizing suspension rods with pivoting or swivel couplings to accommodate displacement of a member being supported. Hochmuth et al U.S. Pat. No. 3,434,531 discloses a semi-rigid tube supporting tie comprising overhead hangers connecting the load member to fixed support beams. The Hennig U.S. Pat. No. 2,420,135 discloses a plurality of flexible bars extending tangentially to an expandable member which is to be supported. The Rees U.S. Pat. No. 3,951,108 discloses a plurality of links interconnected by pins in slotted openings to accommodate movement by balancing load and displacement from one point to another. The French Pat. No. 1,208,629 apparently discloses a hanger coupled by rods to pivot points and frame support members.

It appears that none of the prior art discussed hereinabove is concerned with the support of a structure which is subject to significant thermal growth in all three dimensions. Thus, none of the arrangements disclosed in the cited prior art appears to possess the capability of satisfactorily supporting a heat exchanger core of the type involved herein.

SUMMARY OF THE INVENTION

In brief, arrangements in accordance with the present invention comprise a plurality of flexible members coupled to the heat exchanger core and suspended at upper pivotable mounting points from a plurality of balance beams. These beams in turn are pivotably supported from stationary support beams secured to the steel support structure enclosing the heat exchanger. By virtue of this combination of balance beams and flexible support members, the heat exchanger core is free to grow both in length and in width without restraint from the support structure. The suspension arrangement also accommodates vertical growth of the heat exchanger core by virtue of the manner of attachment of the support system to the core, near either the top or bottom of the core, as mounted.

In one particular arrangement in which the core is oriented horizontally, the suspension system comprises a pluraity of flexible straps pivotably mounted to overhead balance beams which in turn are pivotably mounted to the overhead support beams. The flexible straps extend downwardly through spaces in the core to pivotably mounted support pads at the underside of the core.

In another particular arrangement in accordance with the present invention, wherein the head exchanger core is vertically oriented, as mounted, the support system comprises a combination of support beams, balance beams pivotably mounted to the support beams, and a plurality of flexible links extending downwardly from the balance beams and connected to projecting ears or brackets which are attached to the core at the upper side thereof.

BRIEF DESCRIPTION OF THE DRAWING

A better understanding of the present invention may be had from a consideration of the following detailed description, taken in conjunction with the accompanying drawing in which:

FIG. 4 is a sectional view taken along the line 4—4 of FIG. 2 and looking in the direction of the arrows;

FIG. 5 is a sectional view taken along the line 5—5 of FIG. 2 and looking in the direction of the arrows;

FIG. 6 is a schematic view in perspective, similar to the view of FIG. 2, of another particular arrangement in accordance with the invention;

FIG. 7 is a view of particular details of the arrangement of FIG. 6 and is taken along the line 7—7 of FIG. 6; and FIG. 8 is a view showing a portion of the structure of FIG. 7, viewed from the right-hand side thereof.

DESCRIPTION OF THE PREFERRED EMBODIMENTS

Figure 1:
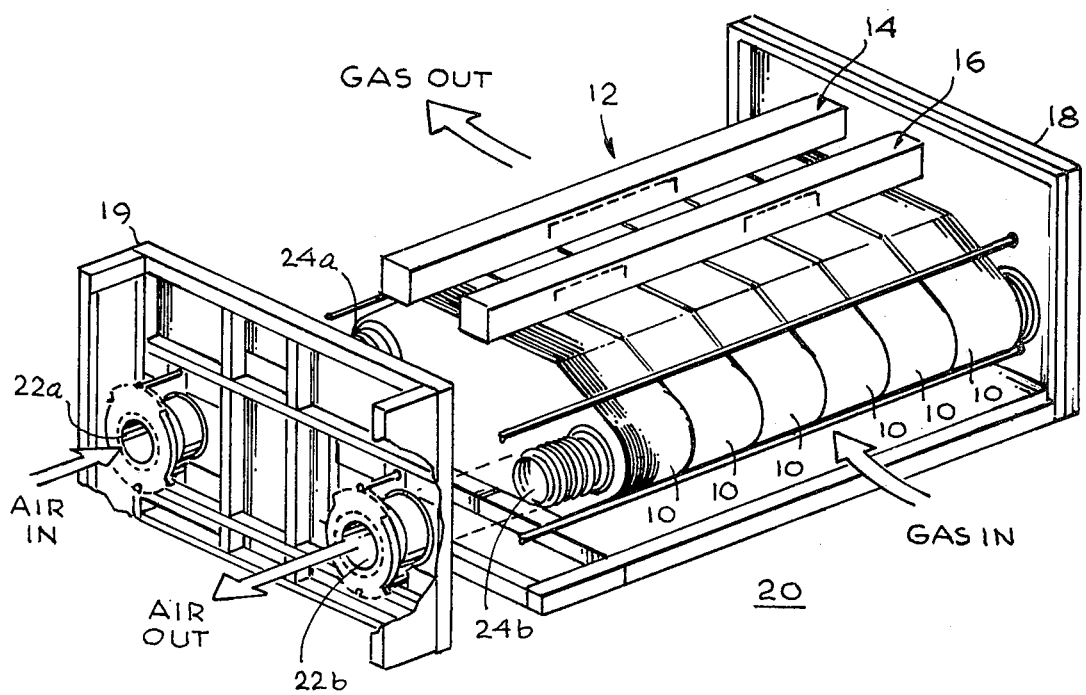
FIG. 1 is a partially exploded view in perspective of a heat exchanger module in which embodiments of the present invention are employed.

As present constructed, heat exchangers utilizing arrangements in accordance with the present invention are fabricated of formed plates and fins assembled in sandwich configuration and brazed together to form core sections. Such core sections 10 are assembled in groups of six (referred to as "six-packs") as shown in FIG. 1 to form a core 12 which, together with associated hardware, comprises a single heat exchanger module 20. A single module 20 is preferably joined with one other module to make up a regenerator. A plurality of regenerators may be utilized to develop a complete heat exchanger system of the desired capacity.

In the operation of a typical system employing a regenerator of the type discussed herein, ambient air enters through an inlet filter and is compressed to about 100 to 150 psi, reaching a temperature of 500° to 600° F. in the compressor section of an associated gas turbine (not shown). It is then piped to the regenerator module 20, entering through the inlet flange 22a (FIG. 1) and inlet duct 24a. In the regenerator module 20, the air is heated to about 900° F. The heated air is then returned via outlet duct 24b and outlet flange 22b to the combustor and turbine section of the associated turbine via suitable piping. The exhaust gas from the turbine is at approximately 1000° to 1100° F. and essentially ambient pressure. This gas is ducted through the regenerator 20 as indicated by the arrows labelled "gas in" and "gas out" (ducting not shown) where the waste heat of the exhaust is transferred to heat the air, as described. Exhaust gas drops in temperature to about 600° F. in passing through the regenerator 20 and is then discharged to ambient through an exhaust stack. In effect, the heat that would otherwise be lost is transferred to the inlet air, thereby decreasing the amount of fuel that must be consumed to operate the turbine. For a 30,000 hp turbine, the regenerator heats 10 million pounds of air per day.

The regenerator is designed to operate for 120,000 hours and 5000 cycles without scheduled repairs, a lifetime of 15 to 20 years in conventional operation. This requires a capability of the equipment to operate at gas turbine exhaust temperatures of 1100° F. and to start as fast as the associated gas turbine so there is no requirement for wasting fuel to bring the system on line at stabilized operating temperatures. The use of the thin formed plates, fins and other components making up the brazed regenerator core sections contribute to this capability. However, it will be appreciated that there is substantial thermal growth in all three dimensions (length, width and height) as a result of the extreme temperature range of operation and the substantial size of the heat exchange units. As an example, the overall dimensions of the module 20 shown in FIG. 1, in one instance, were approximately 17 feet in width, 12 feet in length (the direction of gas flow) and 7.5 feet in height. The weight of the core approximated 35,000 pounds.

Figure 2:
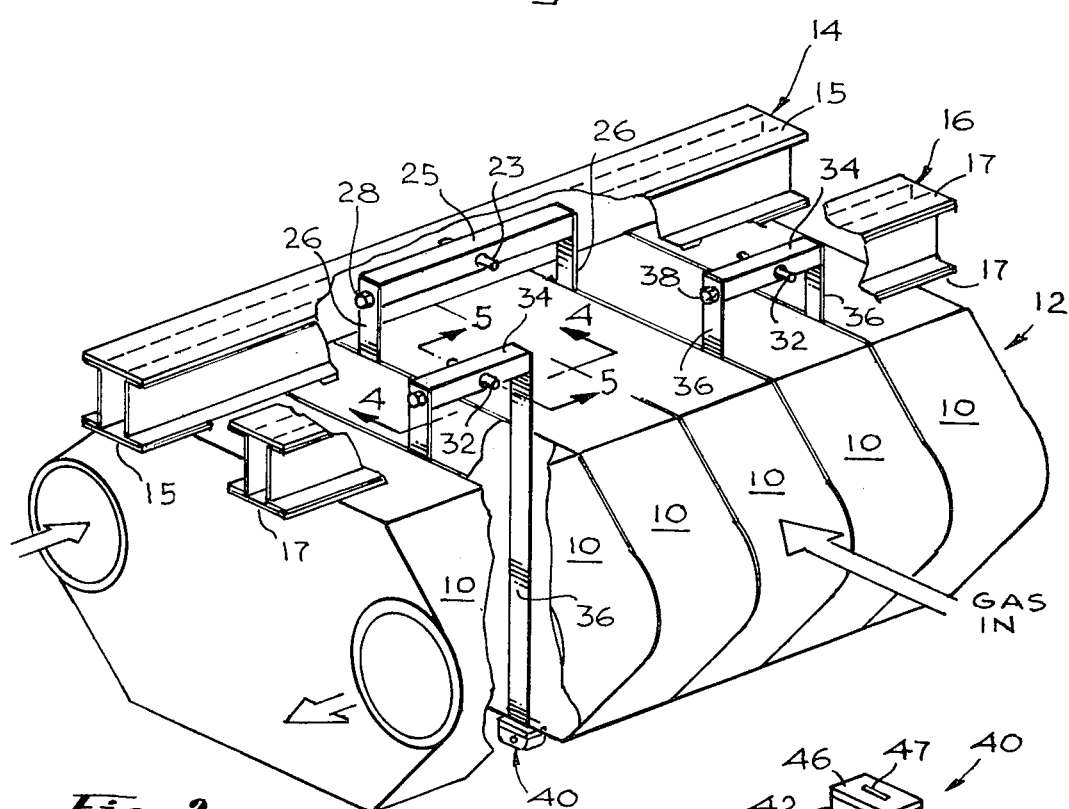
FIG. 2 is a schematic representation in perspective of one particular arrangement in accordance with the present invention.

Referring particularly to FIG. 2, the heat exchanger core 12 may be seen to be supported from two pairs of main cross beams 14 and 16 which are tied together by tie plates 15 and 17, respectively. The beams 14, 16 are affixed at one end to the forward frame structure 19 (FIG. 1) and are secured lengthwise but mounted by means of slots to rearward frame structure 18 in order to permit thermal growth in the width dimension.

The first pair of main cross (or cold support) beams 14 pivotably support, by means of a trunnion or pivot pin 23, a first balance beam 25 from which extend a pair of flexible Inconel straps 26 connected by pins 28 to the balance beam 24.

Figure 3:
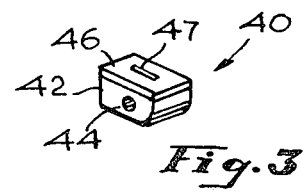
FIG. 3 is a view showing details of a component employed in the arrangement of FIG. 2.

The second pair of main cross (or hot support) beams 16 support by pivot pins 32 a pair of balance beams 34. A pair of flexible Inconel straps 36 is attached to its associated balance beam 34 by means of pin connections 38. Each of the Inconel straps 26 and 36 extends downwardly through a narrow space between adjacent core sections 10 to associated support pads such as 40. As shown in FIG. 3, the support pad 40 comprises a casting 42 having a pivot pin 44 for attachment to the strap 26 or 36. An insulating strip 46 is mounted on the upper side of the support pad 40 and the adjacent core sections 10 bear against this insulating strip 46. The casting 42 and strip 46 define a slot 47 for receiving the lower end of the flexible strap 26 or 36 for attachment via the pivot pin 44.

The cold support beams 14 are on the cold (gas exit) side of the left-to-right center line of the core 12 and the hot support beams 16 are on the opposite side of the core center line where the hot exhaust gases enter the core. Adjacent core sections 10 are secured together by bars and straps welded about their periphery except at the manifold portions where expandable sealing members (not shown) are provided to accommodate thermal growth. The balance beam 25 is longer than the balance beam 34, sufficient to straddle a pair of central core sections 10 and, with its associated straps 26, provide the support for the weight of the core 12 to one side of the center line. The balance beams 34 each straddle a corresponding core section 10 and provide support for that core section and the two sections adjacent. The hot support beams 16 on the gas inlet side of the core center line are slightly closer thereto than are the cold support beams 14. Since the side of the heat exchanger 12 supported by the balance beams 34 and straps 36 is the gas inlet side, it operates at higher temperatures than the side supported by the balance beam 25 and straps 26. The inlet side experiences greater thermal growth than the outlet side and the multiple balance beam and support strap structure 34, 36 serves to accommodate this greater expansion from thermal growth at the higher temperatures encountered.

Further structural details of the support structure of FIG. 2 are shown in the sectional views of FIGS. 4 and 5. These show a balance beam 34 suspended between the main cross beams 16 by means of a pivot pin or trunnion 32. The pivot pin 32 is held in position by doubler plates 52 affixed as by welding to the beams 16 and by cotter pins 54.

The flexible straps are pivotably supported from the balance beam 34 by means of pivot pins 38 mounted in the ends of the beam 34 and threaded at their outer end to receive a retaining nut 56 and washer 58. Shims 59 are provided on both sides of each strap 36 to position the straps properly on the pivot pin 38 so the straps extend downwardly through the centers of the spaces between the associated core sections 10.

The arrangement of the balance beam 25 and its associated straps 26 is identical to that shown in FIGS. 4 and 5, except that the beam 25 is slightly more than twice the length of one of the beams 34.

By virtue of this support arrangement, growth of the core 12 in a direction aligned with gas flow is accommodated by the pivoted supports at opposite ends of the straps 26, 36. The shift in weight of the core during thermal expansion in this direction during operation is balanced by the differences of off-center positioning of the main support beams 14 and 16 relative to the center line of the core, as described above.

The flexible straps 26 and 36 permit thermal growth of the core in a direction from left to right as shown in FIG. 2 by bending or flexing to the extent needed to accommodate this growth. The pivotable mounting of the balance beams 25 and 34 permits the support structure to accommodate the shift in weight resulting from thermal growth in this direction, thus maintaining substantially balanced forces on the support beams 14 and 16 without transmitting undue lateral stresses to this structure. Since the support of the core 12 is applied at the under side and space is provided at the upper side thereof, the core can grow in a vertical direction without any interference from the support structure.

FIGS. 6–8 show details of a similar mounting arrangement for a heat exchanger core 12' oriented in the vertical direction (rotated 90° from the core 12 shown in FIGS. 1 and 2). In this arrangement, a single pair of main cross beams 60 is provided, mounted at their opposite ends to corresponding structure of the frame and case (not shown) in a manner similar to that described for the structure of FIGS. 1 and 2. The cross beams 60 support a pair of first balance beams 62, coupled thereto by pivot pins 64. Each of the balance beams 62 in turn supports a pair of orthogonally directed, second balance beams 66 suspended from rods 68. Each of the second balance beams 66 in turn supports a series of links 70 which is attached at the lower end thereof by a pivotable mounting 72 to a projecting ear or bracket 74 affixed to the core 12' at a juncture between adjacent core sections 10'.

Referring to FIGS. 7 and 8, it will be seen that the pivot pin 64 mounting the first balance beam 62 to the cross beams 60 is held in position by plates 80 and cotter pins 82. The rod 68 extending downwardly from the first balance beam 62 to the second balance beam 66 is provided at its opposite ends with rocker pins 84, 86 which are oriented to permit pendulum-like movement of the rod 68 relative to the beams 62, 66 without binding.

The series 70 of links extending between the second beam 66 and the core bracket 74 comprises first and second sets of connectors 90, 92. The first set 90 is shown comprising an inverted U-bolt 94 secured to the beam 66 by nuts 96 and washers 98. A second, elongated U-bolt 100 is linked with the U-bolt 94 and supports a cross plate 102, held in position by nuts and washers 96, 98. A similar, inverted elongated U-bolt 100 is linked through an opening in the ear or bracket 74 attached to the heat exchanger core. Each of the plates 102 of the elongated U-bolts 100 is threaded through its center and a rod 106 is mounted in supporting relationship therein.

The second set 92 of vertical support links comprises an apertured strap 110 mounted in a slot of the beam 36 and welded thereto. A similar strap 112 is secured, as by welding, to the heat exchanger core as part of the bracket 74. Each of the straps 110, 112 is threaded by an associated U-bolt 114 having corresponding plates 116 fastened thereon. A rod 118 extends between threaded openings in the centers of the plates 116.

This arrangement of the two sets 90, 92 of supporting links oriented as shown permits the respective U-bolts and rods to be mounted closely adjacent each other without interference between them.

The combination of the balance beams and sets of links in the support system for the vertical mounting arrangement of FIGS. 6–8 effectively supports the heat exchanger core 12' while permitting thermal growth in all three dimensions without distortion of the core or unbalancing of the applicable force distribution. The roller action of the rocker pins 84, 86 and the relatively pivotable connections between the respective links in the sets of the suspension members 90, 92 accommodate displacement in length and width dimensions without development of undue lateral stress. The action of the first and second balance beams automatically accommodates any shift in weight distribution due to thermal growth. Since the core 12' is suspended from the core support brackets 74 along the upper side of the core with sufficient space for expansion being provided underneath the core, the core 12' is free to expand in the vertical direction without interference from the support system and adjacent structure.

The heat exchanger core support systems of the present invention advantageously provide the necessary support for the substantial weight of a large heat exchanger core in a manner which effectively accommodates the thermal growth experienced in operation without restraint relative to the heat exchanger case. By virtue of the flexibility of hangers and the balancing capability of the support beams connected thereto, any shift in force direction and the balancing of weight distribution during expansion and contraction of the heat exchanger core from thermal variations during operation are readily accommodated. The various components making up the support system are relatively simple in construction and means of attachment, and are readily susceptible to field maintenance, where necessary. Alternative arrangements are provided for heat exchangers mounting the core in horizontal and vertical attitudes with equal effectiveness.

Although there have been described above specific arrangements of a heat exchanger support system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A method of mounting two adjacent sets of flexible suspension links, each including a plurality of U-bolts, comprising:
    mounting the two sets of links between a suspension member and a structure to be supported thereby so that the U-bolts of one set are respectively orthogonally aligned with the U-bolts of the other set to prevent interference between the two sets.

2. The method of claim 1 further comprising selecting U-bolts of different lengths for links in the two sets and mounting a U-bolt of a shorter length in one set adjacent a U-bolt of a longer length in the other set to prevent interference between adjacent U-bolts.

3. The method of claim 1 further including the step of inserting a suspension strap member, provided with an aperture for receiving a U-bolt, in said one set to constitute one of the links thereof.

4. The method of claim 1 further including the step of orienting two adjacent U-bolts of one set in inverted juxtaposition relative to each other.

5. The method of claim 1 or claim 4 further including the step of providing each of the U-bolts in said one set with a cross member removably affixed thereon in position for coupling to an adjacent link in the set.

6. The method of claim 5 further including the step of including a suspension rod affixed to and extending between the cross members of a pair of opposed adjacent U-bolts in one set of links.

7. The method of claim 2 or claim 4 further including the step of coupling suspension rods between adjacent pairs of oppositely juxtaposed U-bolts, the rods being provided of different lengths to compensate for the differences in lengths of the U-bolts.

8. The method of claim 1 further including the step of connecting the two sets of suspension links to a common suspension member by means of a U-bolt in one set and a flat suspension plate in the other set, which suspension plate is provided with an aperture for linking to an adjacent U-bolt in that other set.

9. The method of claim 1 further including the step of connecting the two adjacent sets of links in a common support arrangement extending in parallel with each other between said suspension member and said structure to be supported thereby.

* * * * *